United States Patent
Nemoto et al.

(10) Patent No.: US 10,579,513 B2
(45) Date of Patent: Mar. 3, 2020

(54) TEST RUN CONTROL METHOD AND APPARATUS

(71) Applicant: FUJITSU LIMITED, Kawasaki-shi, Kanagawa (JP)

(72) Inventors: Yusuke Nemoto, Chigasaki (JP); Tsunehisa Doi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/052,226

(22) Filed: Aug. 1, 2018

(65) Prior Publication Data

US 2019/0042399 A1 Feb. 7, 2019

(30) Foreign Application Priority Data

Aug. 3, 2017 (JP) .................. 2017-150554

(51) Int. Cl.
*G06F 9/44* (2018.01)
*G06F 11/36* (2006.01)
*G06F 8/54* (2018.01)
*G06F 8/41* (2018.01)

(52) U.S. Cl.
CPC .......... *G06F 11/3688* (2013.01); *G06F 8/443* (2013.01); *G06F 8/54* (2013.01); *G06F 11/368* (2013.01); *G06F 11/3684* (2013.01)

(58) Field of Classification Search
CPC ............. G06F 11/3688; G06F 11/3664; G06F 11/3684; G06F 11/362; G06F 11/3672

USPC ......................................... 717/124
See application file for complete search history.

(56) References Cited

U.S. PATENT DOCUMENTS

2007/0234300 A1* 10/2007 Leake .................. G06F 8/51
717/124

FOREIGN PATENT DOCUMENTS

JP 2008-204405 A 9/2008

* cited by examiner

*Primary Examiner* — Chuck O Kendall
(74) *Attorney, Agent, or Firm* — Fujitsu Patent Center

(57) ABSTRACT

An apparatus updates module information containing information on interfaces of modules contained in source code of a test-run target, when an update of an interface in the source code is detected. The apparatus refers to test-case information containing pieces of information on plural test cases, and selects a run-target test case from among the plural test cases, based on test run times taken in previous runs of the plural test cases. The apparatus generates a dummy module to include simplified code by simplifying code in source code of a second module to be statically linked to a first module called during a previous run of the selected run-target test case, so that the simplified code is not related to implementation of the interface indicated in the updated module information. The apparatus compiles the first module and the dummy module, and issues an instruction to run the selected run-target test case.

15 Claims, 18 Drawing Sheets

FIG. 2

| TEST CASE ID | DEPENDED MODULE NAME | STATIC LINK MODULE NAME | RUN TIME | RUN STATE | LAST RUN DATE AND TIME |
|---|---|---|---|---|---|
| Test1 | ClassA, ClassB, ClassC | ClassD | 10[s] | NotStarted | 3/2/2017 15:01 |
| Test2 | ClassA | ClassD | 7[s] | NotStarted | 3/2/2017 15:08 |
| Test3 | ClassB | - | 5[s] | NotStarted | 3/2/2017 15:12 |
| Test4 | ClassC | - | 3[s] | NotStarted | 3/2/2017 15:15 |
| Test5 | ClassA, ClassB, ClassC, ClassD | ClassA, ClassB, ClassC, ClassD | 20[s] | Pending | 3/2/2017 15:20 |

FIG. 4

| MODULE NAME | INTERFACE INFORMATION | COMPILATION COMPLETION FLAG | DUMMY MODULE GENERATION COMPLETION FLAG |
|---|---|---|---|
| ClassA | method1() method2(String) | False | False |
| ClassB | method1() | True | False |
| ClassC | method1() | False | True |
| ClassD | method1() | True | True |
| ClassE | method1() | True | False |

FIG. 6

Pay.java (DEPENDED MODULE)

```
import Class JapanTax
public class Pay{
            *
            *
            *

Tax.java (INTERFACE)

```
public interface Tax {
   double getTaxPrice(double cost);
}
```

FIG. 8

JapanTax.java (STATIC LINK MODULE)

```
public class JapanTax implements Tax {
  public double getTaxPrice(double cost) {

*
            *
            * return cost * 1.08;
  }
}
```

FIG. 9

JapanTax.java (DUMMY MODULE)

```
public class JapanTax implements Tax {
  public double getTaxPrice(double cost) {
    System.exit(255);
    return 0;
  }
}
```

FIG. 16

```
00:00:00 START OF ClassA COMPILATION
00:00:02 COMPLETION OF ClassA COMPILATION
00:00:02 START OF ClassB COMPILATION
00:00:04 COMPLETION OF ClassB COMPILATION
00:00:04 START OF ClassC COMPILATION
00:00:10 COMPLETION OF ClassC COMPILATION

00:00:10 START OF ClassA PREPARATION
00:00:11 COMPLETION OF ClassA PREPARATION
00:00:11 START OF ClassB PREPARATION
00:00:12 COMPLETION OF ClassB PREPARATION
00:00:12 START OF ClassC PREPARATION
00:00:14 COMPLETION OF ClassC PREPARATION

00:00:14 START OF TEST 1 RUN
00:00:14 START OF TEST 2 RUN
00:00:24 COMPLETION OF TEST 2 RUN
00:00:29 COMPLETION OF TEST 1 RUN
```

FIG. 17

```
00:00:00 START OF ClassA COMPILATION
00:00:02 COMPLETION OF ClassA COMPILATION
00:00:02 START OF ClassB COMPILATION
00:00:04 COMPLETION OF ClassB COMPILATION
00:00:04 START OF ClassC COMPILATION
00:00:04 START OF ClassA PREPARATION
00:00:05 COMPLETION OF ClassA PREPARATION
00:00:06 START OF ClassB PREPARATION
00:00:07 COMPLETION OF ClassB PREPARATION
00:00:07 START OF TEST 1 RUN
00:00:10 COMPLETION OF ClassC COMPILATION
00:00:10 START OF ClassC PREPARATION
00:00:12 COMPLETION OF ClassC PREPARATION
00:00:12 START OF TEST 2 RUN
00:00:22 COMPLETION OF TEST 2 RUN
00:00:22 COMPLETION OF TEST 1 RUN
```

FIG. 18

```
00:00:00 START OF ClassA COMPILATION
00:00:02 COMPLETION OF ClassA COMPILATION
00:00:02 START OF ClassB COMPILATION
00:00:04 COMPLETION OF ClassB COMPILATION
00:00:04 START OF ClassC COMPILATION
00:00:04 START OF ClassA PREPARATION
00:00:05 COMPLETION OF ClassA PREPARATION
00:00:06 START OF ClassB PREPARATION
00:00:07 COMPLETION OF ClassB PREPARATION
00:00:07 START OF TEST 1 RUN
00:00:10 TEST 1 RUN FAILURE
00:00:10 COMPLETION OF ClassC COMPILATION
00:00:10 START OF ClassC PREPARATION
00:00:12 COMPLETION OF ClassC PREPARATION
00:00:12 START OF TEST 1 RUN (SECOND RUN)
00:00:12 START OF TEST 2 RUN
00:00:22 COMPLETION OF TEST 2 RUN
00:00:27 COMPLETION OF TEST 1 RUN
```

… # TEST RUN CONTROL METHOD AND APPARATUS

CROSS-REFERENCE TO RELATED APPLICATION

This application is based upon and claims the benefit of priority of the prior Japanese Patent Application No. 2017-150554, filed on Aug. 3, 2017, the entire contents of which are incorporated herein by reference.

FIELD

The embodiments discussed herein are related to test run control method and apparatus.

BACKGROUND

A development technique called continuous integration has been used, which automates software compilation, packaging, test run, and so on. Using the continuous integration enables automation of correctness check after source code is modified and preparation for the actual environment. This may reduce human errors.

Japanese Laid-open Patent Publication No. 2008-204405, for example, proposes a related technique in which a test is performed by combining information on test cases of a previously performed test and a dependency relationship obtained by analyzing a target program.

SUMMARY

According to an aspect of the invention, an apparatus updates module information containing pieces of information on interfaces of modules contained in source code of a test run target, in a case where an update of an interface in the source code is detected. The apparatus refers to test case information containing pieces of information on a plurality of test cases, and selects a run target test case from among the plurality of test cases based on test run times taken in previous runs of the plurality of test cases. The apparatus generates a dummy module to include simplified code by simplifying code in source code of a second module to be statically linked to a first module called during a previous run of the selected run target test case, so that the simplified code is not related to implementation of the interface indicated in the updated module information. The apparatus compiles the first module and the dummy module, and issues an instruction to run the selected run target test case.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of test case information;

FIG. 4 is a diagram illustrating an example of module information;

FIG. 6 is a diagram illustrating an example of a depended module;

FIG. 7 is a diagram illustrating an example of the source code of an interface;

FIG. 8 is a diagram illustrating an example of the source code of a static link module;

FIG. 9 is a diagram illustrating an example of the source code of a dummy module;

FIG. 16 is a diagram illustrating an example of the result of executing continuous integration in a comparative example;

FIG. 17 is a diagram illustrating an example of the result of executing continuous integration in an embodiment (without calling of a dummy module);

FIG. 18 is a diagram illustrating an example of the result of executing continuous integration in the embodiment (with calling of a dummy module);

DESCRIPTION OF EMBODIMENTS

For detection of bugs in the source code of a test run target, it is preferable to finish the continuous integration quickly. However, since the continuous integration involves continuous execution of a plurality of tasks, the time taken to complete the continuous integration increases according to the number of tasks.

For example, in a case where the source code of a test run target contains a plurality of modules, all modules to be used in the test run may be compiled before starting the test run. In this case, the larger the number of modules, the longer the compilation time and therefore the longer the time before the test starts.

An object of the embodiments discussed herein as one aspect thereof is to expedite the start of a test run in continuous integration.

Example of Overall Configuration of System According to Embodiment

Figure 1:
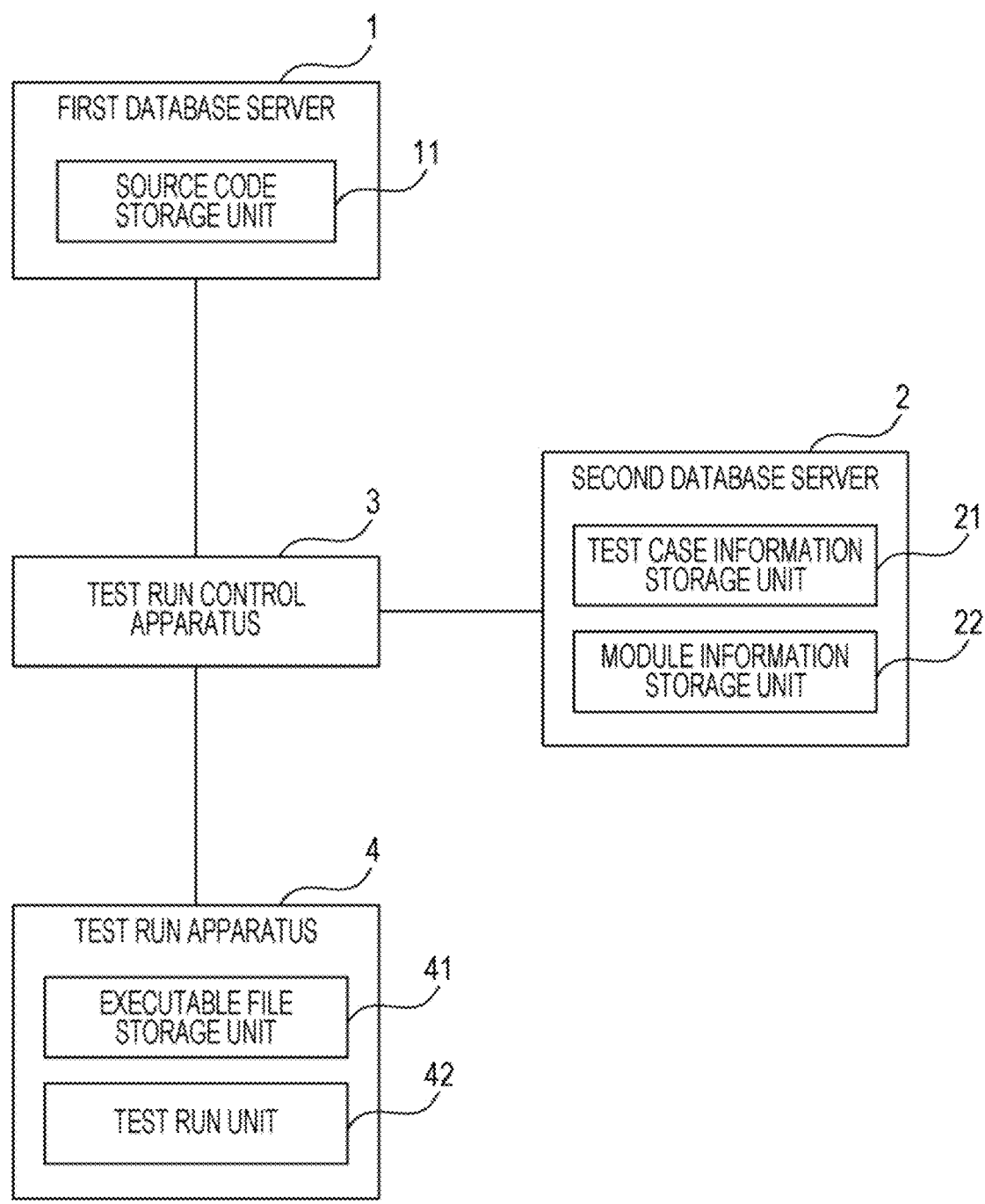
FIG. 1 is a diagram illustrating an example of the overall configuration of a system according to an embodiment.

Embodiments will be described below with reference to the drawings. FIG. 1 illustrates an example of the overall configuration of a system according to an embodiment. The system according to the embodiment includes a first database server 1, a second database server 2, a test run control apparatus 3, and a test run apparatus 4.

The first database server 1 includes a source code storage unit 11. The source code storage unit 11 stores the source code of a test run target.

The second database server 2 includes a test case information storage unit 21 and a module information storage unit 22. The test case information storage unit 21 stores test case information for the source code stored in the source code storage unit 11. The module information storage unit 22 stores module information on the source code stored in the source code storage unit 11. Details of the test case information and the module information will be described later.

The test run control apparatus 3 acquires the source code from the source code storage unit 11. The test run control apparatus 3 refers to the test case information stored in the test case information storage unit 21 and the module information stored in the module information storage unit 22 and performs an update process. The test run control apparatus 3 compiles the acquired source code to thereby generate an executable file and transmits the executable file to the test run apparatus 4.

The test run control apparatus 3 is an example of a computer. Details of the processing by the test run control apparatus 3 will be described later.

The test run apparatus 4 includes an executable file storage unit 41 and a test run unit 42. The executable file storage unit 41 stores the executable file received from the test run control apparatus 3. The test run unit 42 runs a test using the executable file based on an instruction from the test run control apparatus 3.

Note that the test run control apparatus 3 may include the executable file storage unit 41 and the test run unit 42. By including the executable file storage unit 41 and the test run unit 42, the test run control apparatus 3 will not communicate with the test run apparatus 4. This may increase the processing speed and reduce the cost.

The source code storage unit 11, the test case information storage unit 21, and the module information storage unit 22 may be stored in the same database server. Also, the test run control apparatus 3 may include at least one of the source code storage unit 11, the test case information storage unit 21, and the module information storage unit 22.

FIG. 2 is a diagram illustrating an example of the test case information. Pieces of information on previously run test cases are recorded in the test case information. As illustrated in FIG. 2, in the test case information, test case identification (ID), depended module name, static link module name, run time, run state, and last run date and time are associated with each other. The test case IDs of all test cases to be run in a continuous integration process according to the present embodiment are recorded prior to starting the continuous integration process.

The test case ID is identification information identifying a test case.

A depended module is a module called in previous runs of the associated test case. For example, the depended module may be a module called a predetermined number of times or more in the history of previous test runs. For one example, the depended module may be a module called 7 times or more in the history of last 10 test runs. The depended module is an example of a first module.

Also, in a case where a dummy module has been called once or more in previous runs of a test case, the module from which the dummy module was generated may be set as the depended module. A dummy module is a module obtained by simplifying code not related to implementation of the interface of the corresponding module. Details of a dummy module will be described later.

A static link module is a module to be statically linked to the associated depended module. Static linking is a technique in which any library used to link a program is contained in the program. The static link module may be a module having a statically linked relationship with the associated depended module a predetermined number of times or more in the history of previous test runs. For example, the static link module may be a module having a statically linked relationship with the associated depended module 7 times or more in the history of last 10 test runs. The static link module is an example of a second module.

The run time is the elapsed time from the start to the end of a previous run of the associated test. For example, the run time may be the average of the elapsed times taken in previous runs of the associated test case. For example, the run time may be the average of the elapsed times taken in a predetermined number of last runs (last five runs) of the associated test case among previous runs of the associated test case.

As for the run state, "NotStarted" represents an initial state. "Started" represents that the associated test case has been selected as the run target. "Compiled" represents that compilation has been completed. "Prepared" represents that preparation has been completed. "Finished" represents that the test has been completed. "Pending" represents that a dummy module has been called during a test run and the test is pending. "Aborted" represents a test run failure or a test error.

The last run date and time represents the last date and time among the dates and times when the associated test case was run.

Figure 3:
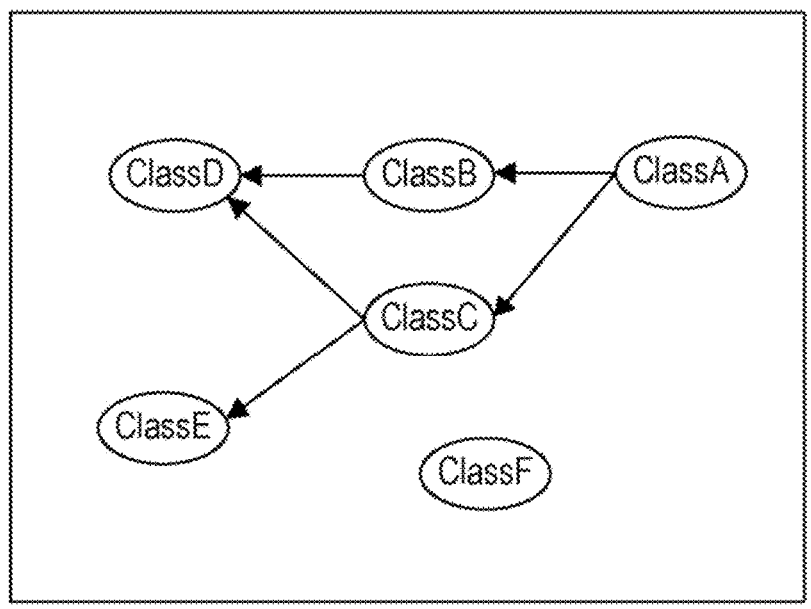
FIG. 3 is a diagram illustrating an example of a dynamic call tree.

FIG. 3 is a diagram illustrating an example of a dynamic call tree. A dynamic call tree indicates the relationship between calls of modules in a test run. The example illustrated in FIG. 3 indicates that ClassA calls ClassB and ClassC, ClassB calls ClassD, and ClassC calls ClassD and ClassE. The example also indicates that ClassF is not called during the test run.

The test run control apparatus 3 generates a dynamic call tree as illustrated in FIG. 3, for example, and identifies the depended modules in the test case information illustrated in FIG. 2 based on the dynamic call tree. In the example illustrated in FIG. 3, the test run control apparatus 3 sets ClassA, ClassB, ClassC, ClassD, and ClassE as the depended modules.

FIG. 4 is a diagram illustrating an example of the module information. In the module information, module name, interface information, compilation completion flag, and dummy module generation completion flag are associated with each other. The interface information is information on the interface implemented by the associated module. In the example illustrated in FIG. 4, the interface information represents the name of the method included in the interface.

The compilation completion flag is a flag indicating whether the associated module has been compiled. If the compilation completion flag is "True", it indicates that the associated module has been compiled. If the compilation completion flag is "False", it indicates that the associated module has not been compiled.

The dummy module generation completion flag is a flag indicating whether a dummy module has been generated for the associated module. If the dummy module generation completion flag is "True", it indicates that a dummy module has been generated for the associated module. If the dummy module generation completion flag is "False", it indicates that no dummy module has been generated for the associated module.

Example of Test Run Control Apparatus

Figure 5:
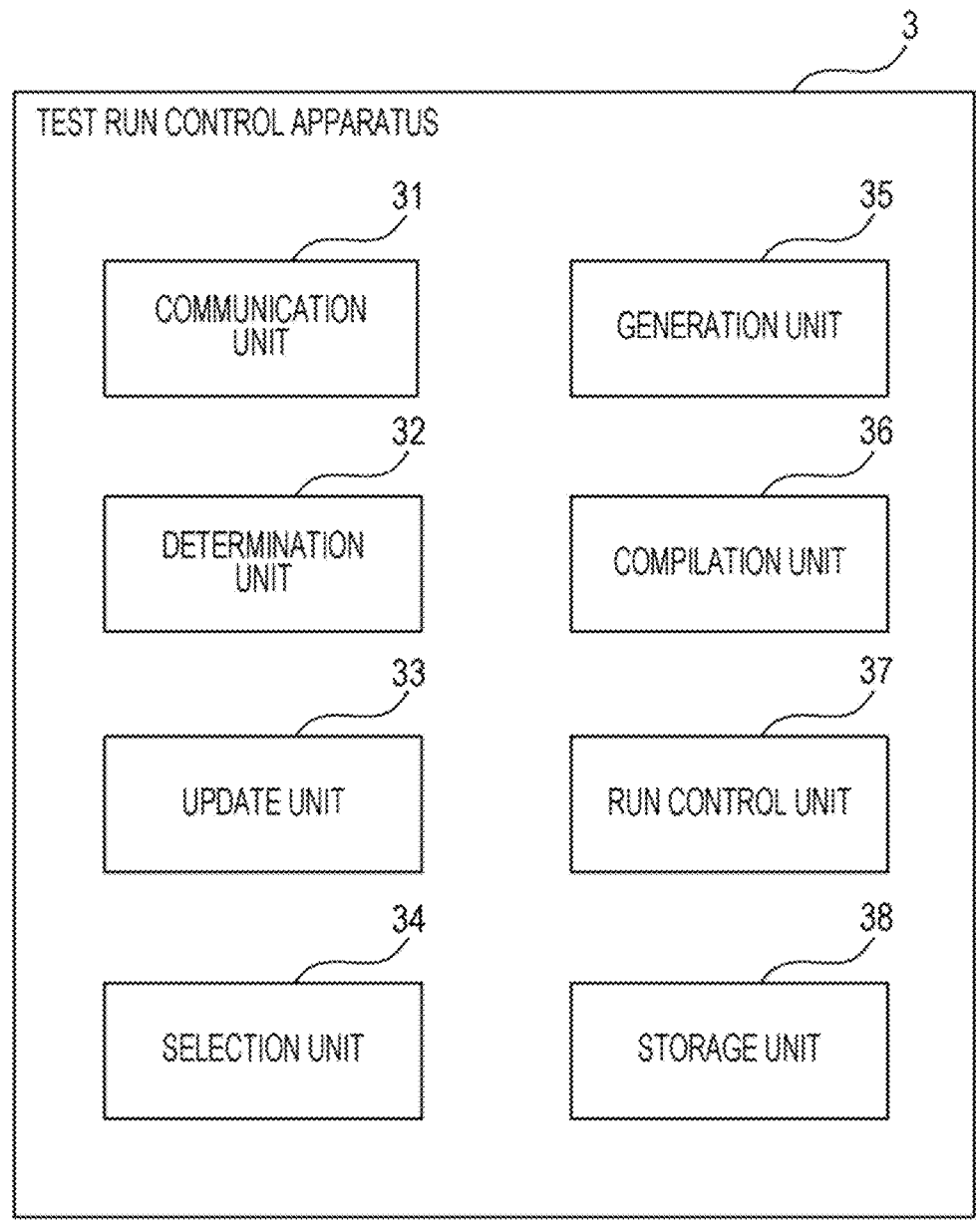
FIG. 5 is a diagram illustrating an example of a test run control apparatus.

FIG. 5 is a diagram illustrating an example of the test run control apparatus 3. The test run control apparatus 3 includes a communication unit 31, a determination unit 32, an update unit 33, a selection unit 34, a generation unit 35, a compilation unit 36, a run control unit 37, and a storage unit 38.

The communication unit 31 receives the source code from the first database server 1. The communication unit 31 also receives the test case information and the module information from the second database server 2. After compilation is executed, the communication unit 31 transmits the executable file to the test run apparatus 4.

The determination unit 32 determines whether or not an interface in the source code of the test run target has been updated in a case where an update of the source code is detected.

If it is determined that an interface in the source code of the test run target has been updated, the update unit 33 updates the interface information contained in the module information. The module information contains pieces of information on the interfaces of the modules contained in the source code.

The update unit 33 sets first information in the module information in a case where a dummy module is generated for a test case, the first information indicating that a dummy module has been generated. The first information is "True" of the dummy module generation completion flag, for example.

The update unit 33 sets second information in the module Information in a case where a module associated with a test case is compiled, the second information indicating that this module has been compiled. The second information is "True" of the compilation completion flag, for example.

In a case where a dummy module is called during the test run, the update unit 33 records information indicating a pending state (for example, "Pending") in the test case information as the run state of the run test case.

The selection unit 34 refers to the test case information, containing pieces of information on a plurality of test cases, and selects a run target test case from among the plurality of test cases based on the test run times taken in previous runs of these test cases. For example, the selection unit 34 selects a test case as the run target from among the plurality of test cases in descending order of the test run time taken in a previous run of the test case. For example, the selection unit 34 may select one of test cases, among the plurality of test cases, having a test run time longer than or equal to a predetermined time, as the run target.

The generation unit 35 generates a dummy module by simplifying code in the source code of the static link module for the depended module in the selected test case that is not related to the implementation of the interface indicated in the updated module information. For example, the generation unit 35 generates a dummy module by deleting code related to the implementation of the interface and further adding code that notifies that a dummy module has been called.

The generation unit 35 determines not to generate a dummy module in a case where the dummy module generation completion flag or the compilation completion flag in the module information for the static link module associated with the selected test case has been updated to "True".

The compilation unit 36 compiles the depended module of the selected test case and the dummy module generated by the generation unit 35. In a case where "Pending" is recorded in the test case information as the run state of the selected test case, the compilation unit 36 compiles the static link module from which the dummy module was generated. The compilation unit 36 includes a compiler, for example.

The compilation unit 36 refers to the module information and, in a case where the compilation completion flag of the depended module executed in previous runs of the selected test case is "True", determines not to compile the depended module.

The run control unit 37 instructs the test run apparatus 4 to run the selected test case.

The storage unit 38 stores various pieces of information to be used in the control by the test run control apparatus 3. For example, the storage unit 38 stores the source code received from the first database server 1 and the test case information and the module information received from the second database server 2.

FIG. 6 is a diagram illustrating an example of a depended module. The source code of the depended module illustrated in FIG. 6 contains a class "Pay". Also, the source code of the depended module illustrated in FIG. 6 designates a class "JapanTax" as its static link.

FIG. 7 is a diagram illustrating an example of the source code of an interface. The interface illustrated in FIG. 7 is described in a file "Tax.java" and contains a method "double getTaxPrice(double cost);". The determination unit 32 refers to source code representing an interface as illustrated in FIG. 7, for example, and determines whether the interface has been updated.

Note that although Java (registered trademark) is used as the programming language in the present embodiment, any language that involves compilation at the time of execution (for example, static typing language) may be used in the present embodiment.

FIG. 8 is a diagram illustrating an example of the source code of a static link module. The source code illustrated in FIG. 8 implements the interface illustrated in FIG. 7. In the source code illustrated in FIG. 8 is described a process of performing a predetermined process and returning a value. For example, the determination unit 32 may refer to source code implementing an interface as illustrated in FIG. 8 and determine whether the interface has been updated.

FIG. 9 is a diagram illustrating an example of the source code of a dummy module. The source code of the dummy module illustrated in FIG. 9 is source code generated based on the source code illustrated in FIG. 8. The process in the method "double getTaxPrice(double cost);", which is described in FIG. 8, is not described in the source code illustrated in FIG. 9. Moreover, code "System.exit(255);" is described in the source code illustrated in FIG. 8 as code that notifies that a dummy module has been called. The code that notifies that a dummy module has been called is not limited to the above code. Upon notification that a dummy module has been called, the test run apparatus 4 transmits information indicating that a dummy module has been called to the test run control apparatus 3.

As illustrated in FIGS. 8 and 9, the source code of a dummy module is generated by simplifying code in the source code of the module from which the dummy module is to be generated that is not related to the implementation of its interface. Accordingly, the compilation time of a dummy module is shorter than that of the module from which the dummy module is generated.

Example of Flow of Processing According to Embodiments

Figure 10:
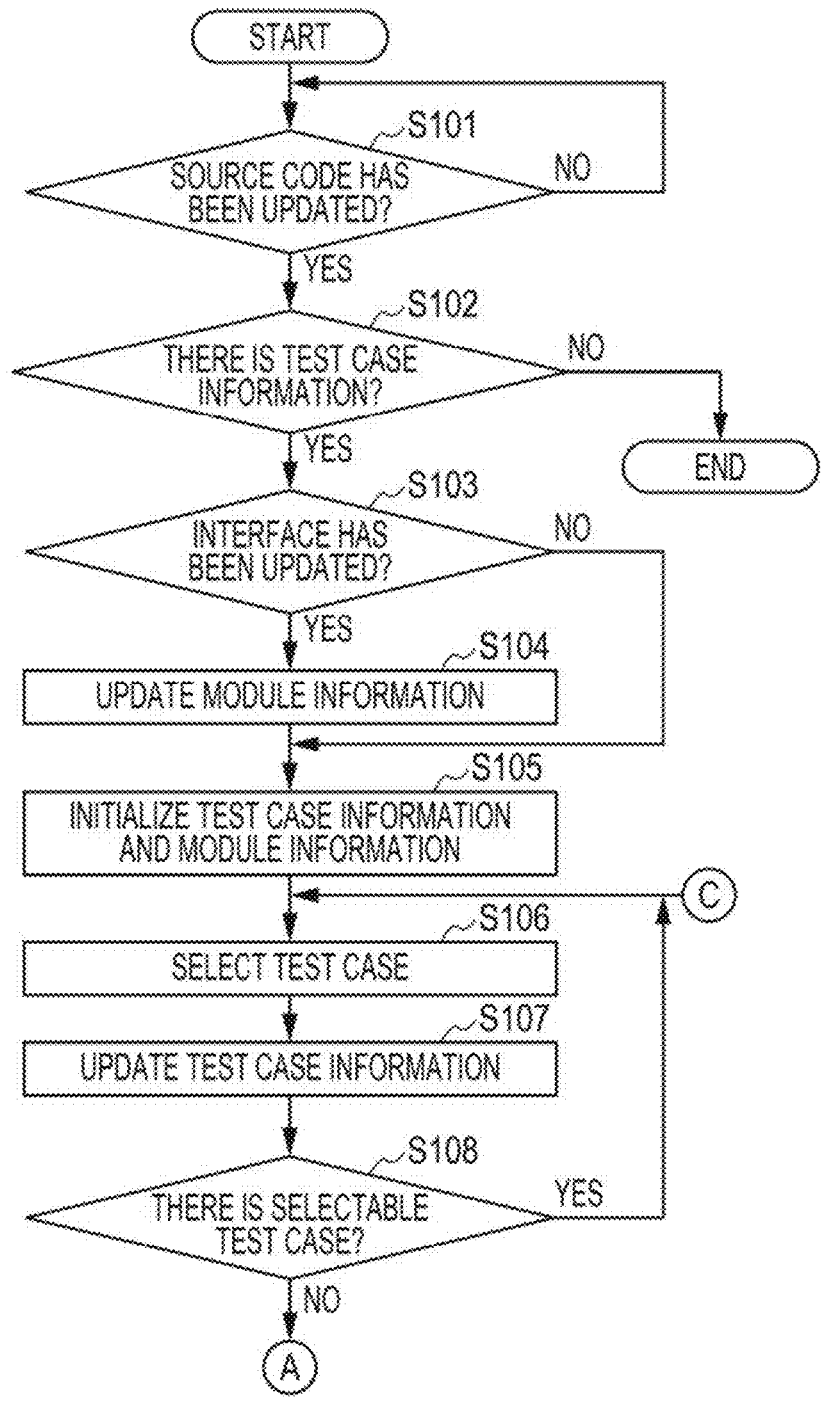
FIG. 10 is a flowchart (part 1) illustrating an example the flow of processing according to a first embodiment.
Figure 11:
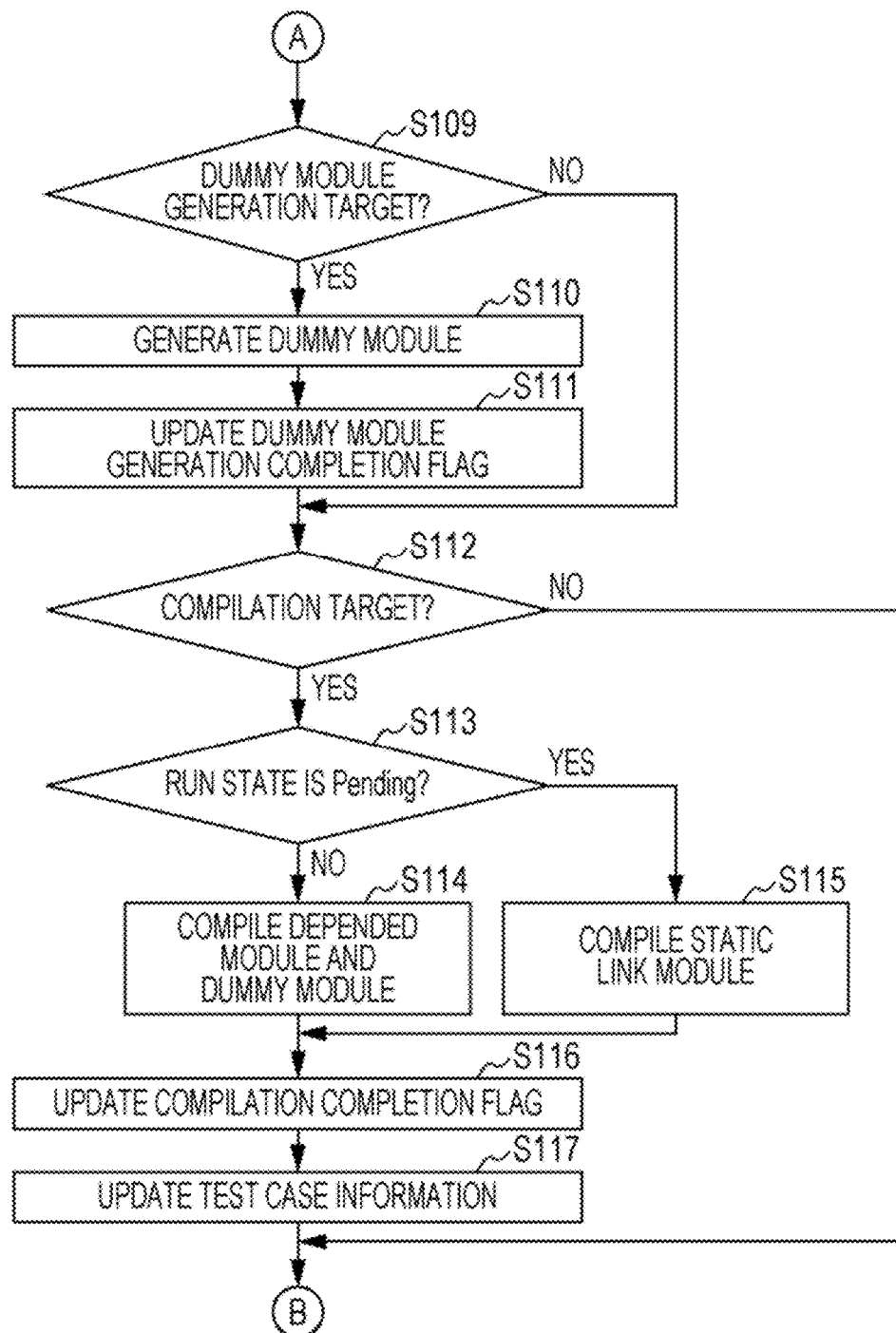
FIG. 11 is a flowchart (part 2) illustrating the example the flow of the processing according to the first embodiment.
Figure 12:
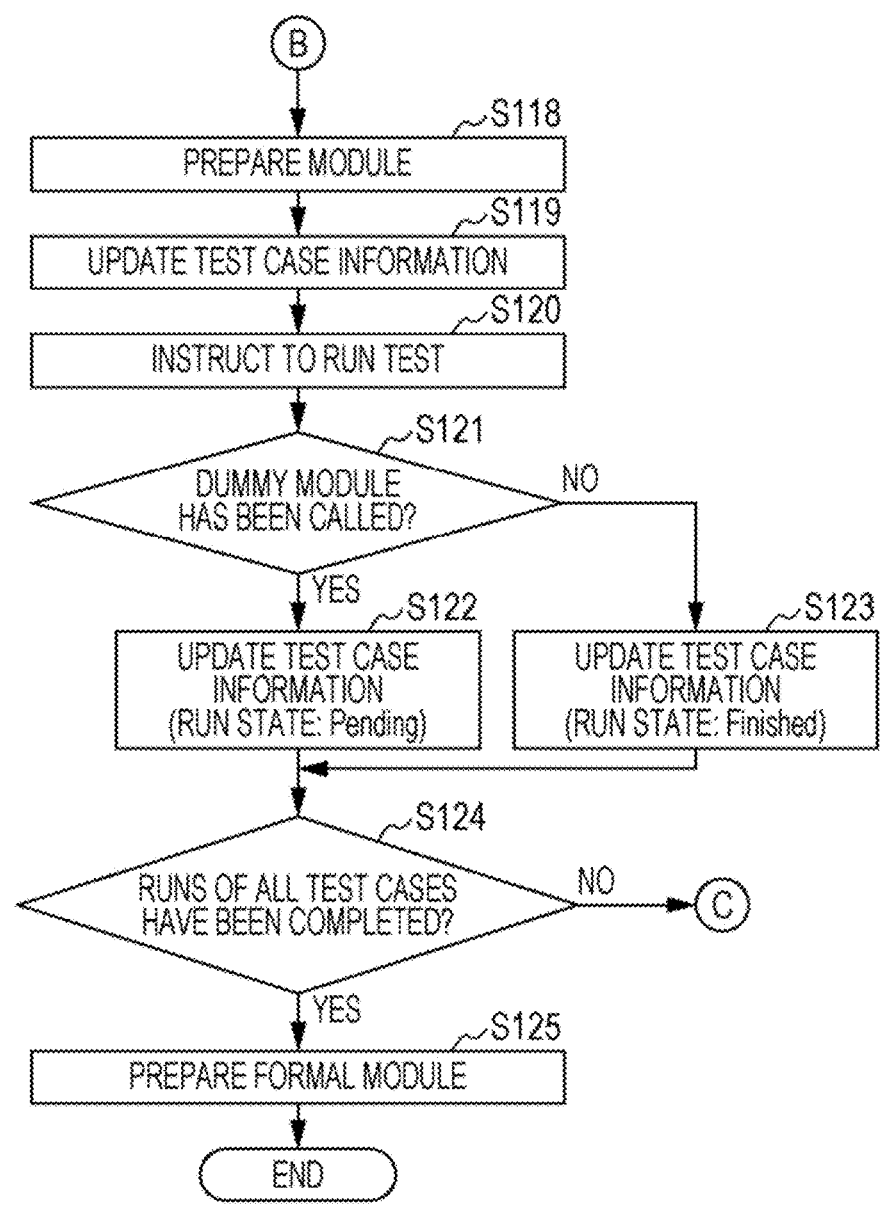
FIG. 12 is a flowchart (part 3) illustrating the example the flow of the processing according to the first embodiment.

FIGS. 10 to 12 are flowcharts illustrating an example of the flow of processing according a first embodiment. The determination unit 32 determines whether the source code of the test run target has been updated (step S101). For example, the determination unit 32 acquires the test case information from the test case information storage unit 21 and refers to the last test run date and time. Then, the determination unit 32 compares the source code with the last test run date and time stored in the source code storage unit 11 and the newest source code with each other and determines whether there is any update.

For the detection of any update of the source code in step S101, a polling method, a hooking method, or the like may be used. In the case of using a polling method, the determination unit 32 periodically refers to the source code storage unit 11 and determines whether or not the source code has been updated.

In the case of using the hooking method, when the source code is updated, the first database server 1 transmits information indicating the update to the test run control apparatus 3. With the transmitted information indicating the update, the determination unit 32 may detect that the source code has been updated.

If NO in step S101, the processing does not proceed to the next step. If YES in step S101, the determination unit 32 determines whether there is test case information in the test case information storage unit 21 (step S102). If NO in step S102, the processing is terminated.

The determination unit 32 may further determine whether a module preparation instruction has been received from a management terminal not illustrated, and the processing may proceed to step S102 if YES in step S101 and a module preparation instruction has been received.

If YES in step S102, the determination unit 32 acquires the source code in the source code storage unit 11 and determines whether an interface has been updated (step S103). Specifically, the determination unit 32 determines whether an interface has been updated by the update of the source code detected in step S101. The interface update is, for example, addition, change, or deletion of an interface.

If YES in step S103, the update unit 33 updates the interface information in the module information based on the content of the interface update (step S104). For example, if a method has been added to an interface, the update unit 33 records the name of the added method into the module information.

If NO in step S103 or after the process in step S104, the update unit 33 initializes the test case information and the module information (step S105). For example, the update unit 33 sets the run states of all test cases in the test case information to "NotStarted". Further, for example, the update unit 33 sets the compilation completion flags and the dummy module generation completion flags of all modules in the module information to "False".

The selection unit 34 refers to the test case information and selects a run target test case based on the run time of each test case (step S106). For example, the selection unit 34 selects the test case with the longest run time among the test cases with the run state "NotStarted" in the test case information, as the run target test case. In a case where there is no test case with the run state "NotStarted" in the test case information, the selection unit 34 selects the test case with the longest run time among the test cases with the run state "Pending" as the test case to be run.

The update unit 33 sets the run state of the test case selected in step S106 in the test case information to "Started" (step S107).

The selection unit 34 determines whether there is a selectable test case in the test case information (step S108). The selectable test case is, for example, a test case with its run state set to "NotStarted" or "Pending". If YES in step S108, the processing returns to step S106. If NO in step S108, the processing moves to step S109.

Note that after the process in step S107, processes in and following step S108 and processes in and following step S109 are executed in parallel. Specifically, the process for selecting the next test case and processes such as compilation and testing of the already selected test case are executed in parallel. Further, in a case where, for example, step S106 is executed repeatedly, thereby selecting a plurality of test cases, the processes in and following step S109 will be executed for the plurality of selected test cases in parallel.

The processing after "A" will be described with reference to FIG. 11. The generation unit 35 refers to the test case information and determines whether the static link module of the selected test case (a test case with the run state "Started") is a dummy module generation target (step S109).

For example, the generation unit 35 determines that the static link module is a dummy module generation target if the compilation completion flag and the dummy module generation completion flag in the module information associated with the static link module are "False".

On the other hand, for example, the generation unit 35 determines that the static link module is not a dummy module generation target if the compilation completion flag or the dummy module generation completion flag in the module information associated with the static link module is "True".

As mentioned above, the processes in and following step S109 are executed in parallel for a plurality of test cases. Thus, if the static link module coincides with the depended module of another test case, there is a possibility that this static link module is compiled. Also, if the static link module coincides with the static link module of another test case, there is a possibility that a dummy module of this static link module is generated.

If YES in step S109, the generation unit 35 refers to the test case information and generates a dummy module based on the static link module for the depended module associated with the selected test case (step S110).

For example, the generation unit 35 generates the dummy module by simplifying code in the source code of the static link module not related to the implementation of the interface indicated in the module information updated in step S104. The dummy module is generated such that an error occurs when the dummy module is called, for example.

Without the static link module compiled, an error occurs when the depended module is executed. However, there is a possibility that the static link module will not be called during the test run. For this reason, the generation unit 35 generates a dummy module of the static link module. A dummy module contains a smaller amount of code than the static link module from which it is generated, and therefore its compilation ends more quickly. Accordingly, the test run control apparatus 3 may shorten the time taken to start running the test.

The update unit 33 updates the dummy module generation completion flag in the module information corresponding to the generated dummy module to "True" (step S111). By updating the dummy module generation completion flag in the module information to "True", the update unit 33 may avoid generation of the same dummy module in the other test cases, for example.

The compilation unit 36 refers to the test case information and determines whether the depended module of the selected test case is a compilation target (step S112).

The compilation unit 36 refers to the module information. Then, in the case where the run state of the test case is "Started", the compilation unit 36 determines any depended module with its compilation completion flag set to "False" as a compilation target. On the other hand, in the case where the run state of the test case is "Started", the compilation unit 36 determines any depended module with its compilation completion flag set to "True" as no compilation target.

In the case where the run state of the selected test case is "Pending", the compilation unit 36 determines any static link module with its compilation completion flag set to "False" as a compilation target. In the case where the run state of the selected test case is "Pending", the compilation unit 36 determines any static link module with its compilation completion flag set to "True" as no compilation target.

If YES in step S112, the compilation unit 36 determines whether the run state of the selected test case is "Pending" (step S113). For example, if the run state of the selected test case is "Started", it will be NO in step S113.

If NO in step S113, the compilation unit 36 compiles the depended module of the selected test case and the generated dummy module (step S114). For example, the compilation unit 36 compiles the depended module associated with the selected test case in the test case information and the generated dummy module.

If YES in step S113, the compilation unit 36 compiles the static link module (step S115). If the run state is "Pending", it represents that a dummy module was called in the last test and the test was not completed. Thus, by compiling the static link module itself, or the module from which the dummy module was generated, the compilation unit 36 may complete the run of the second test.

In one example, the number of occurrences of pending may be added to the test case information, and the compilation unit 36 may compile the static link module if the number of occurrences of pending exceeds a predetermined number.

The update unit 33 updates the compilation completion flag of the depended module in the module information compiled in step S114 or the compilation completion flag of the static link module in the module information compiled in step S115 to "True" (step S116). By updating the compilation completion flag in the module information to "True", the update unit 33 may avoid compilation of the same module in the processing for the other test cases. For example, even if the depended module coincides with the depended module of another test case, the compilation completion flag updated to "True" will result in NO in step S112, so that the depended module will not be compiled.

The update unit 33 updates the run state of the test case in the test case information associated with the compiled module to "Compiled" (step S117).

If NO in step S112 or after the process in step S117, the processing moves to step S118 from "B".

The run control unit 37 prepares the compiled module in the test run apparatus 4 (step S118). The module to be prepared is each module in step S114 or the module compiled in step S115. For example, the run control unit 37 prepares the module by transmitting the executable file generated by the compilation to the test run apparatus 4 and causing the executable file storage unit 41 to store it.

In step S118, in the case of running a test case with the run state "pending", the run control unit 37 does not prepare any dummy module but prepares the executable file of the static link module generated by the process in step S115. This is because, if a dummy module is prepared again, the dummy module will be called again and the test will not be properly finished.

The update unit 33 updates the run state of the test case in the test case information that has completed module preparation to "Prepared" (step S119).

The run control unit 37 instructs the test run apparatus 4 to run the test case with the run state "Prepared" (step S120). For example, the run control unit 37 transmits the identification information of the test case with the run state "Prepared" and test run instruction information to the test run apparatus 4.

Then, the test run unit 42 of the test run apparatus 4 runs the test by using the executable file in the executable file storage unit 41 and transmits the result of the test run to the test run control apparatus 3. If a dummy module is called during the test run, an error occurs, so that the test run unit 42 detects that a dummy module has been called. If a dummy module is called during the test run, the test run unit 42, for example, transmits information identifying the called dummy module to the test run control apparatus 3.

The update unit 33 determines whether a dummy module has been called, based on whether the information identifying a called dummy module has been received (step S121). If determining that a dummy module has been called (YES in step S121), the update unit 33 updates the run state of the run test case in the test case information to "Pending" (step S122).

If a dummy module has been called, the update unit 33 updates the run state to "Pending", and therefore the determination in step S113 in the next run will be YES. Then, in the process in step S115, the compilation unit 36 will compile the static link module, or the module from which the dummy module was generated. Hence, when the test is run again, the dummy module will not be called and the test run will be completed.

Note that if it is determined that a dummy module has been called (YES in step S121), the test run control apparatus 3 may execute abnormal end of the test. Alternatively, if it is determined that a dummy module has been called (YES in step S121), the test run control apparatus 3 may finish compiling all modules and then perform the test again.

If determining that, no dummy module has been called (NO in step S121), the update unit 33 updates the run state of the run test case in the test case information to "Finished" (step S123). Further, based on the test result, the update unit 33 updates the depended module, the static link module, and the run time in the test case information.

The run control unit 37 determines whether the runs of all test cases contained in the test case information have been completed (step S124). The run control unit 37 determines that the runs of all test cases have been completed if, for example, all run states in the test case information are "Finished".

If NO in step S124, the processing moves to step S106 in FIG. 10 from "C". If YES in step S124, the run control unit 37 prepares the formal modules (step S125).

Note that in a case where all run states in the test case information are "Finished" but there is a module in the module information with its compilation completion flag set to "False", the compilation unit 36 compiles the module with the compilation completion flag set to "False". In a case where all run states in the test case information are "Finished" but there is a module in the module information with its compilation completion flag set to "False", the run control unit 37 may transmit information indicating abnormal end to the management terminal not illustrated. The run control unit 37 may transmit information indicating abnormal end to the management terminal not illustrated also in a case where a different abnormality occurs during the test run.

Figure 13:
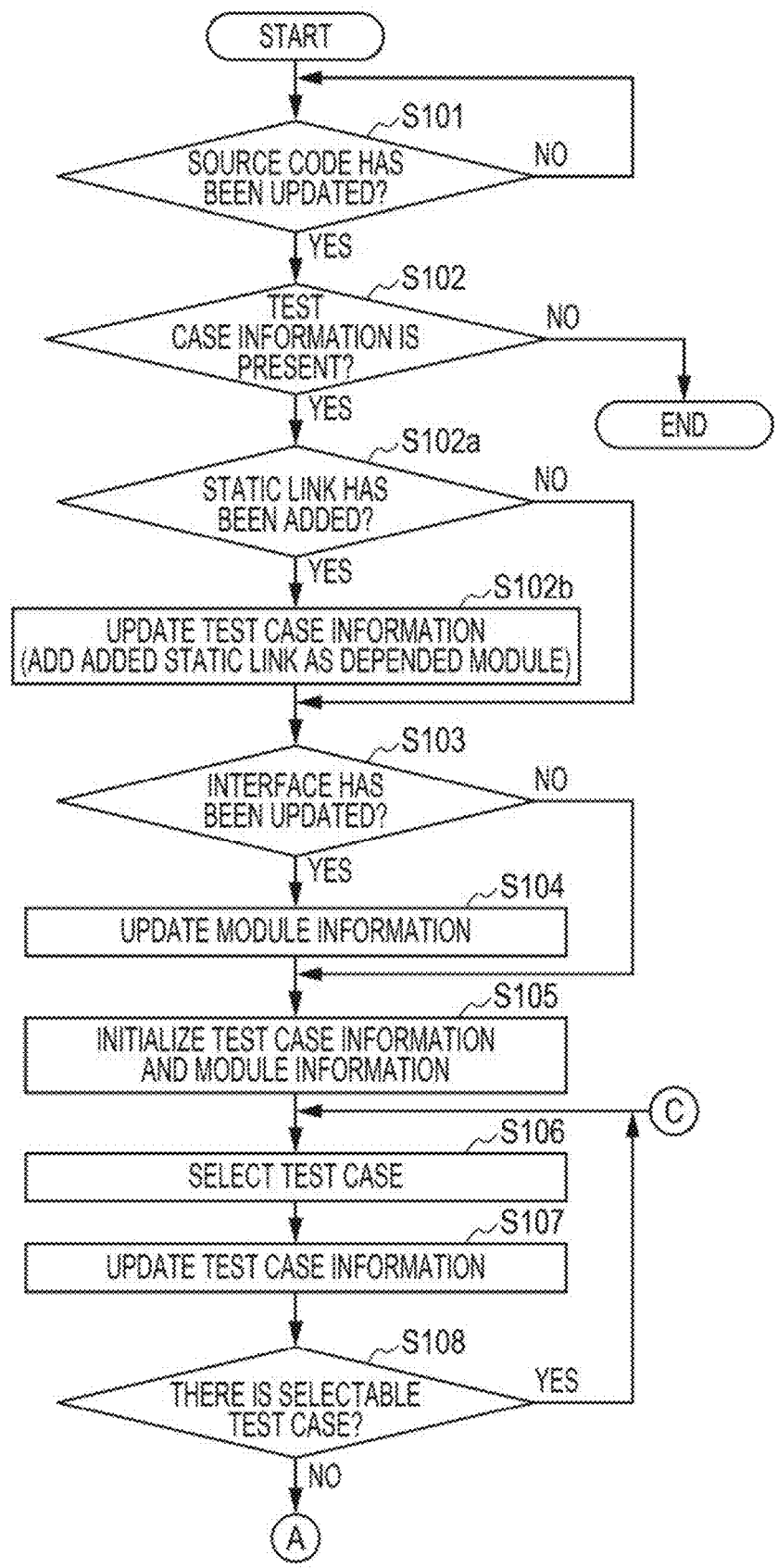
FIG. 13 is a flowchart (part 1) illustrating an example the flow of processing according to a second embodiment.
Figure 14:
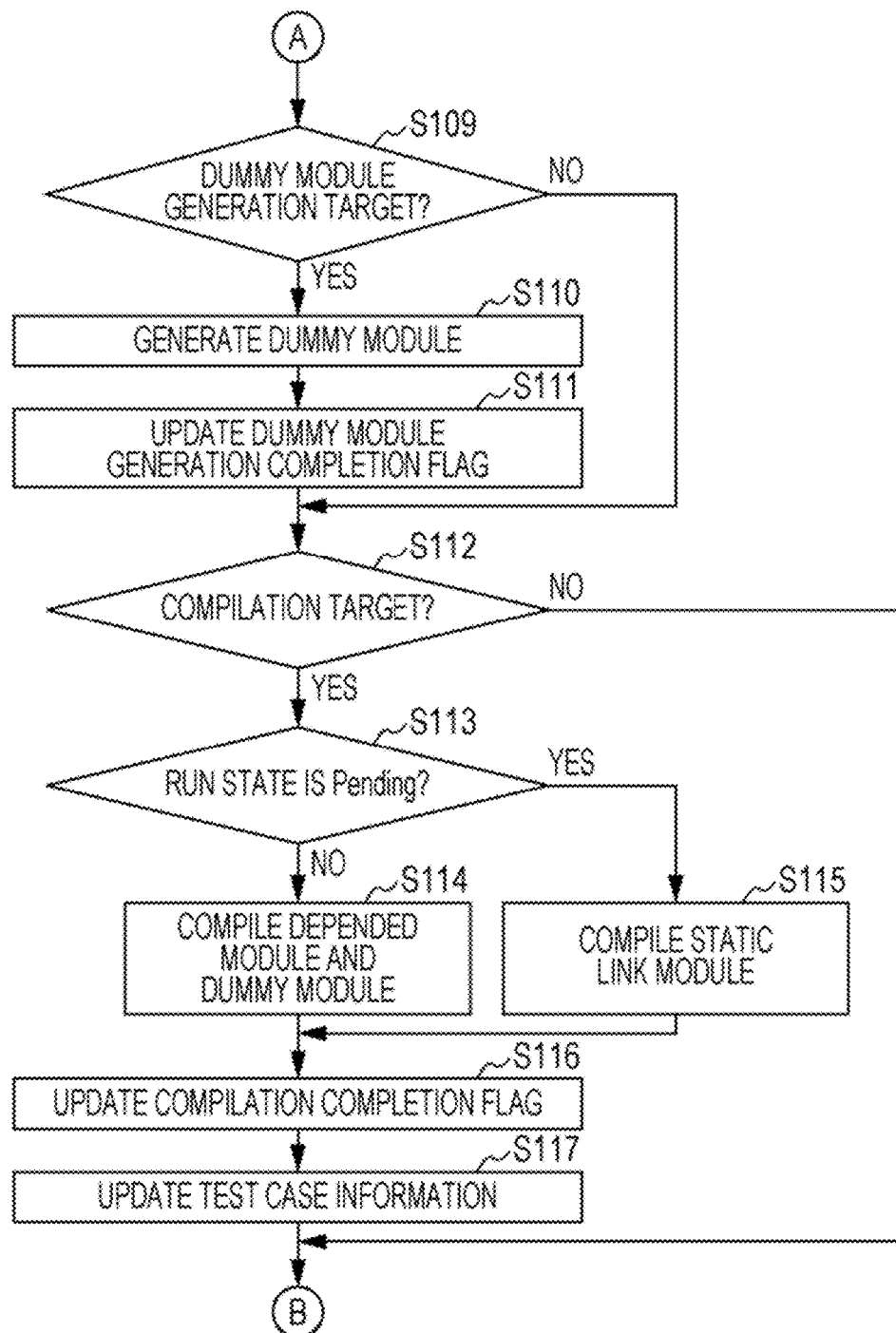
FIG. 14 is a flowchart (part 2) illustrating the example the flow of the processing according to the second embodiment.
Figure 15:
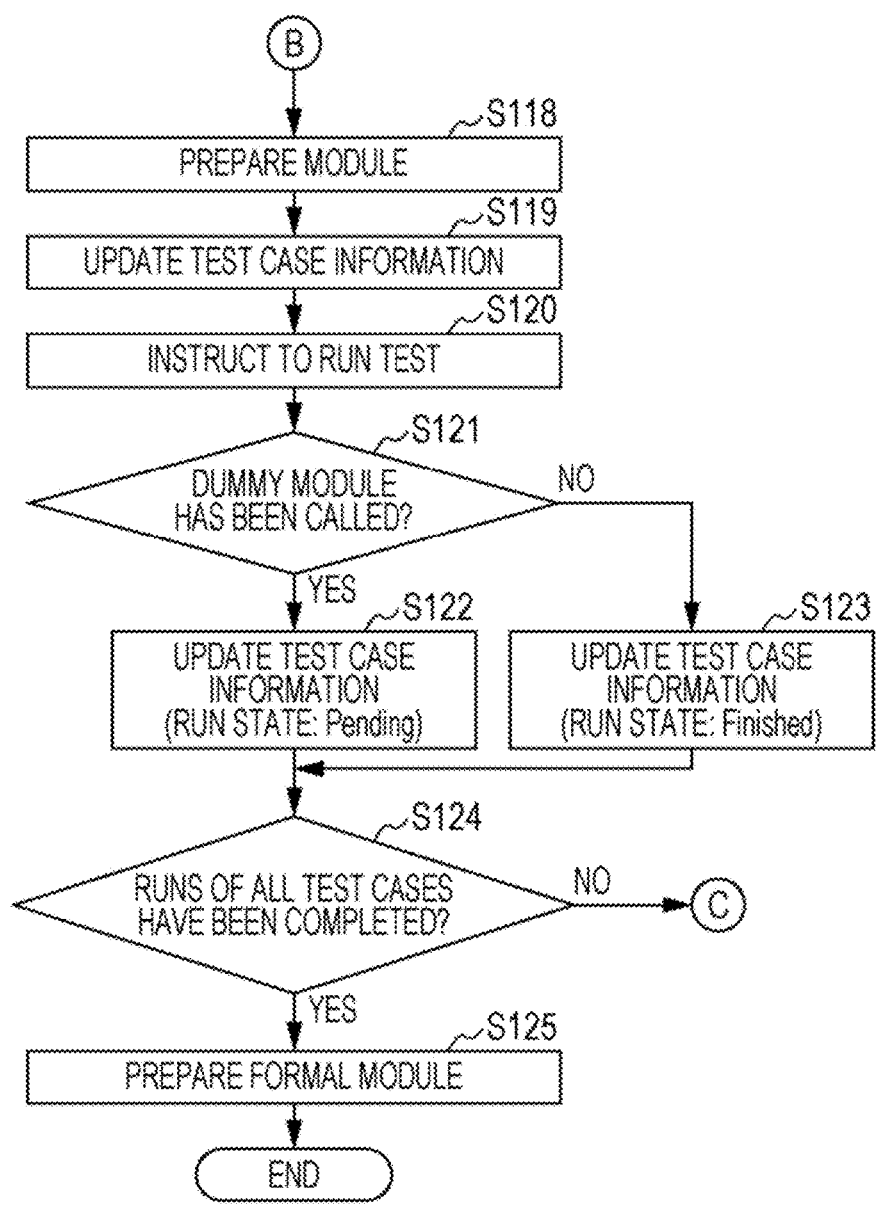
FIG. 15 is a flowchart (part 3) illustrating the example the flow of the processing according to the second embodiment.

FIGS. 13 to 15 are flowcharts illustrating an example of the flow of processing according to a second embodiment. The flowcharts illustrated in FIGS. 13 to 15 differ from the flowcharts in the first embodiment illustrated, in FIGS. 10 to 12, in that steps S102a and S102b are added in FIG. 13. Description of the same processes as those in the flowcharts in the first embodiment will be omitted in the following description.

The determination unit 32 determines whether a static link has been added as any depended module in the update of the source code detected in step S101 (step S102a). If NO in step S102a, the processing moves to step S103.

If YES in step S102a and if the name of the added static link module has not been recorded in the depended module column in the test case information, the update unit 33 makes an update that adds the static link module to the depended module column (step S102b).

This is done because a module not included as any depended module in the test case information is a module that was not called in the test run last time, and if a static link is newly added, it is likely to be called in the test run this time.

By adding the name of the added static link module to the depended module column in step S102b, the added static link module will be handled as a depended module and compiled in step S114. Thus, even in a case where the test case associated with this static link module is selected and this static link module is called during the test, the test run control apparatus 3 may complete the test run.

Example of Result of Executing Continuous Integration

FIG. 16 is a diagram illustrating the result of executing continuous integration in a comparative example. The comparative example indicates that each of ClassA, ClassB, and ClassC is compiled and prepared and then Test1 and Test2 are run. In the comparative example, no dummy module is generated, and the preparation and the tests are executed after completing the compilation of all modules. In the comparative example, the time from the start to the end of the continuous integration is 29 seconds.

FIG. 17 is a diagram illustrating an example of the result of executing continuous integration in an embodiment (without calling of a dummy module). In the example illustrated in FIG. 17, the selection unit 34 selects Test1 as the test case to be run first, and the compilation unit 36 compiles ClassA and ClassB, which are the depended modules of Test1. Then, the run control unit 37 issues an instruction to run Test1 after completing the preparation of ClassA and ClassB.

Note that if there is a static link module for each of ClassA and ClassB, FIG. 17 will involve compilation of a dummy module generated based on the static link module. Nonetheless, the compilation time for the dummy module is short as compared to that for the normal module and is therefore ignored in the run result illustrated in FIG. 17.

In the example illustrated in FIG. 17, the time from the start to the end of the continuous integration is 22 seconds. In the example illustrated in FIG. 17, Test1 starts to be run without waiting for ClassC to be compiled and prepared. Accordingly, the entire process time of the continuous integration is shorter than that in the example illustrated in FIG. 16.

As described above, the test run control apparatus 3 may expedite the start of a test run and accordingly shorten the entire process time of the continuous integration.

FIG. 18 is a diagram illustrating the result of executing continuous integration in the embodiment (with calling of a dummy module). In FIG. 18, the execution result up to the point when Test1 starts to be run is the same as that in the example illustrated in FIG. 17. Assume, for example, that a dummy module is called during the run of Test1, so that the run of Test1 fails.

If the dummy module called during the run of Test1 is a dummy module based on ClassC, Test1 may be completed by completing the compilation of ClassC. The example illustrated in FIG. 18 assumes that ClassC is the depended module for Test2 and its compilation starts before the start of the run of Test1. Then, the run control unit 37 starts the second run (re-run) of Test1 after the completion of the compilation and preparation of ClassC.

In the example illustrated in FIG. 18, the time from the start to the end of the continuous integration is 27 seconds. Even if the run of a test fails due to calling of a dummy module, the test run control apparatus 3 according to the embodiment may expedite the start of a test run and accordingly shorten the entire process time of the continuous integration as compared to the comparative example.

Figure 19:
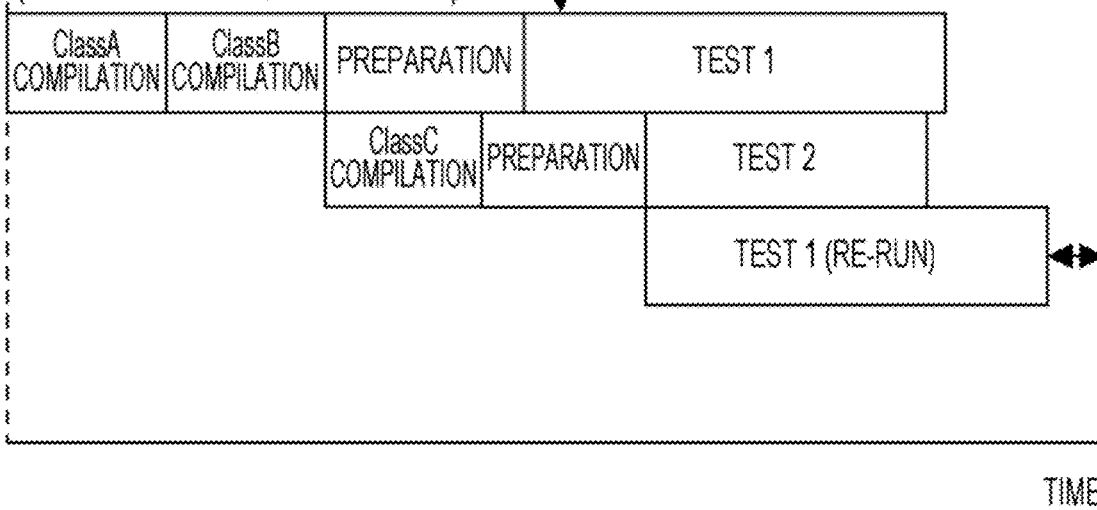
FIG. 19 is a diagram illustrating an example of comparisons between the run results in FIGS. 16 to 18.

FIG. 19 is a diagram illustrating comparisons between the execution results in FIGS. 16 to 18. The execution result of the comparative example illustrated in (a) of FIG. 19 corresponds to the execution result in FIG. 16. The execution result of an embodiment example illustrated in (b) of FIG. 19 (without calling of a dummy module) corresponds to the execution result in FIG. 17. The execution result of an embodiment example illustrated in (c) of FIG. 19 (with calling of a dummy module) corresponds to the execution result in FIG. 18.

As illustrated in FIG. 19, the test run control apparatus 3 may expedite the start of a test run. Also, as in the example in (c) of FIG. 19, even if a test run fails due to calling of a dummy module, there is a possibility that the module from which the dummy module was generated is being compiled in parallel with the test run. Therefore, even if a dummy module is called, the test run control apparatus 3 may expedite the start of the test run and accordingly shorten the entire process time of the continuous integration.

Example of Hardware Configuration of Test Run Control Apparatus

Figure 20:
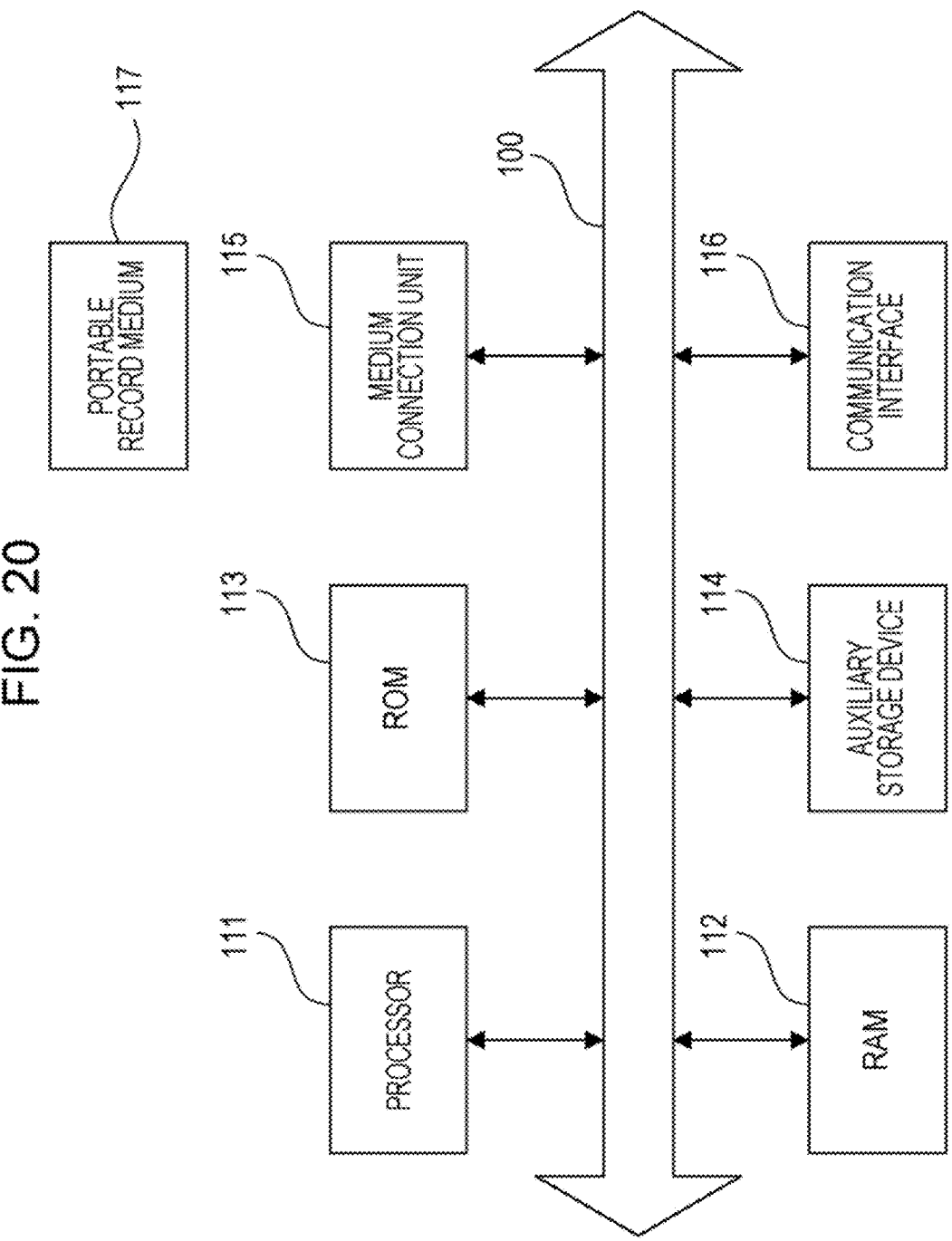
FIG. 20 is a diagram illustrating an example of the hardware configuration of the test run control apparatus.

Next, an example of the hardware configuration of the test run control apparatus 3 will be described with reference to an example in FIG. 20. As illustrated in the example in FIG. 20, a processor 111, a random access memory (RAM) 112, and a read only memory (ROM) 113 are connected to a bus 100. An auxiliary storage device 114, a medium connection unit 115, and a communication interface 116 are connected to this bus 100 as well.

The processor 111 executes a program decompressed in the RAM 112. A test run control program that performs the processing in any of the above embodiments may be employed as the executed program.

The ROM 113 is a non-volatile storage device that stores the program to be decompressed into the RAM 112. The auxiliary storage device 114 is a storage device that stores various pieces of information. For example, a hard disk drive, a semiconductor memory, or the like may be employed as the auxiliary storage device 114. The test run control program that performs the processing in any of the above embodiments may be recorded in the auxiliary storage device 114.

The medium connection unit 115 is provided connectable to a portable record medium 117. A portable memory, an optical disc (for example, a compact disc (CD) or a digital versatile disc (DVD)), a semiconductor memory, or the like may be employed as the portable record medium 117. The test run control program that performs the processing in any of the above embodiments may be recorded in the portable record medium 117.

The storage unit 38, illustrated in FIG. 5, may be implemented by the RAM 112, the auxiliary storage device 114, and so on. The communication unit 31, illustrated in FIG. 5, may be implemented by the communication interface 116. The determination unit 32, the update unit 33, the selection unit 34, the generation unit 35, the compilation unit 36, and the run control unit 37, illustrated in FIG. 5, may be implemented by the processor 111 executing the test run control program given thereto.

Each of the RAM 112, the ROM 113, the auxiliary storage device 114, and the portable record medium 117 is an example of a computer-readable physical storage medium. These physical storage media are not temporary media such as signal carrier waves.

Example of Hardware Configuration of Test Run Apparatus

Figure 21:
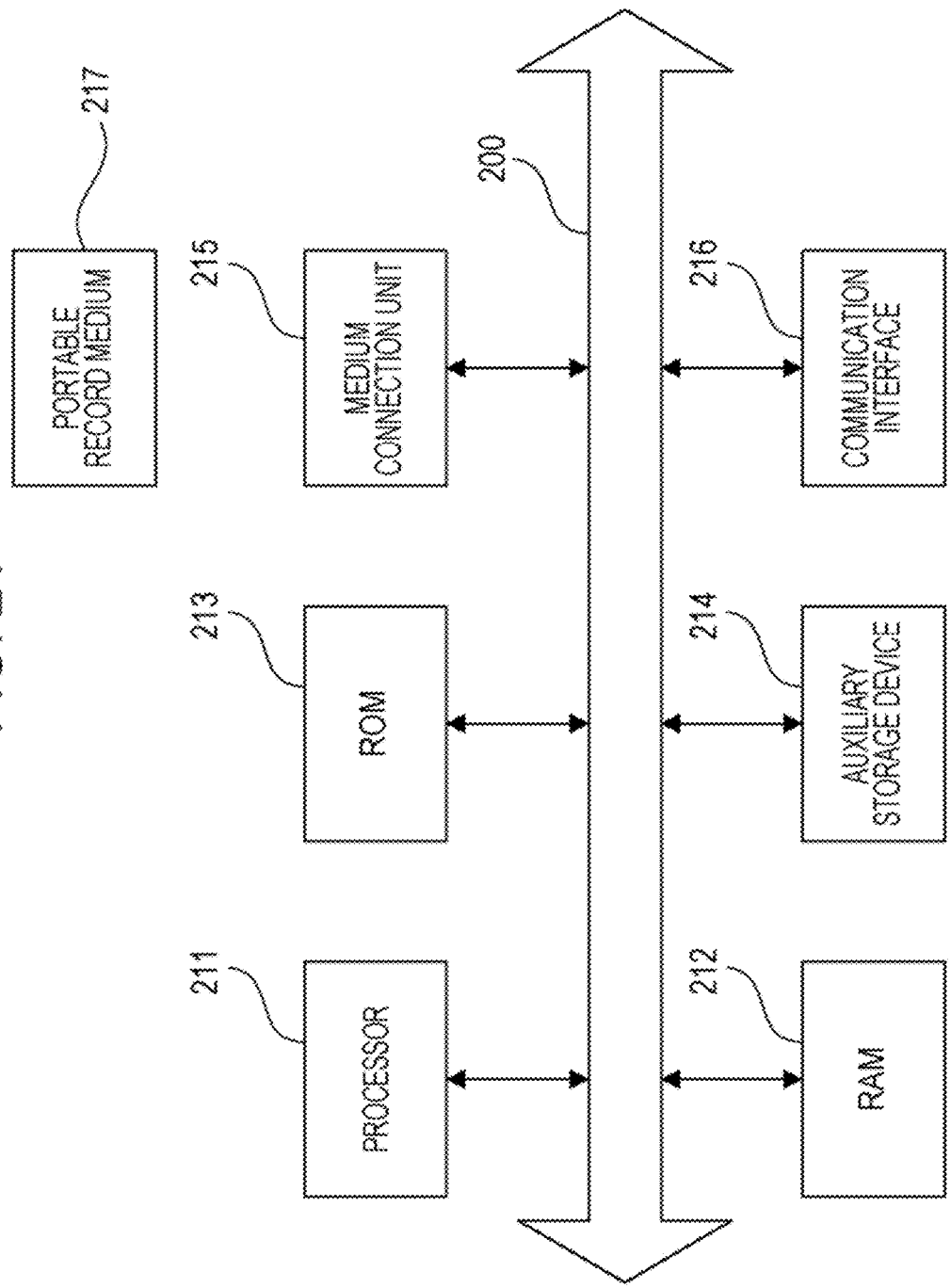
FIG. 21 is a diagram illustrating an example of the hardware configuration of the test run apparatus.

Next, an example of the hardware configuration of the test run apparatus 4 will be described with reference to an example in FIG. 21. As illustrated in the example in FIG. 21, a processor 211, a random access memory (RAM) 212, and a read only memory (ROM) 213 are connected to a bus 200. An auxiliary storage device 214, a medium connection unit 215, and a communication interface 216 are connected to this bus 200 as well.

The processor 211 executes a program decompressed in the RAM 212. The test run control program that performs the processing in any of the above embodiments may be employed as the executed program.

The ROM 213 is a non-volatile storage device that stores the program to be decompressed into the RAM 212. The auxiliary storage device 214 is a storage device that stores various pieces of information. For example, a hard disk drive, a semiconductor memory, or the like may be employed as the auxiliary storage device 214. The test run control program that performs the processing in any of the above embodiments may be recorded in the auxiliary storage device 214.

The medium connection unit 215 is provided connectable to a portable record medium 217. A portable memory, an optical disc (for example, a compact disc (CD) or a digital versatile disc (DVD)), a semiconductor memory, or the like may be employed as the portable record medium 217. The test run control program that performs the processing in any of the above embodiments may be recorded in the portable record medium 217.

The executable file storage unit 41, illustrated in FIG. 1, may be implemented by the RAM 212, the auxiliary storage device 214, and so on. The test run unit 42, illustrated in FIG. 1, may be implemented by the processor 211 executing the test run control program given thereto.

Each of the RAM 212, the ROM 213, the auxiliary storage device 214, and the portable record medium 217 is an example of a computer-readable physical storage medium. These physical storage media are not temporary media such as signal carrier waves.

Other Matters

The present embodiments are not limited to the above-described embodiments but include various configurations and embodiments without departing from the gist of the present embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
   updating module information containing pieces of information on interfaces of modules contained in source code of a test run target, in a case where an update of an interface in the source code is detected;
   referring to test case information containing pieces of information on a plurality of test cases, and selecting a run target test case from among the plurality of test cases based on test run times taken in previous runs of the plurality of test cases;
   generating a dummy module to include simplified code by simplifying code in source code of a second module to be statically linked to a first module called during a previous run of the selected run target test case, so that the simplified code is not related to implementation of the interface indicated in the updated module information;
   compiling the first module and the dummy module; and
   issuing an instruction to run the selected run target test case.

2. The non-transitory, computer-readable recording medium according to claim 1, the process further comprising:
   recording information indicating a pending state as a run state of the selected test case in the test case information in a case where the dummy module is called during a test run;
   compiling the second module, from which the dummy module was generated, in a case where the information indicating the pending state is recorded as the run state of the selected test case in the test case information; and
   issuing an instruction to run the selected test case again.

3. The non-transitory, computer-readable recording medium according to claim 1, the process further comprising determining whether or not an interface in the source code of the test run target has been updated, in a case where an update of the source code of the test run target is detected.

4. The non-transitory, computer-readable recording medium according to claim 1, the process further comprising referring to the test case information, containing the pieces of information on the plurality of test cases, and selecting a run target test case from among the plurality of test cases in descending order of a test run time taken in a previous run of the test case.

5. The non-transitory, computer-readable recording medium according to claim 1, the process further comprising:

determining whether or not the second module to be statically linked to the first module in one of the test cases has been added in a case where an update of the source code of the test run target is detected; and compiling the second module in a case where the second module has been added in the update of the source code of the test run target and the one of the test cases is selected.

6. The non-transitory, computer-readable recording medium according to claim 1, the process further comprising:

setting first information in the module information in a case where the dummy module associated with the test case is generated, the first information indicating that the dummy module has been generated;

setting second information in the module information in a case where the first module associated with the test case is compiled, the second information indicating that the first module has been compiled; and referring to the module information in a case where another test case is selected, and determining not to generate a dummy module based on a second module associated with the other test case in a case where the first information or the second information has been set for the second module associated with the other test case.

7. The non-transitory, computer-readable recording medium according to claim 1, the process further comprising:

setting second information in the module information in a case where the first module associated with the test case is compiled, the second information indicating that the first module has been compiled; and referring to the module information in a case where another test case is selected, and determining not to compile a first module called during a previous run of the other test case, in a case where the second information has been set for the first module.

8. A method comprising:

updating module information containing pieces of information on interfaces of modules contained in source code of a test run target, in a case where an update of an interface in the source code is detected;

referring to test case information containing pieces of information on a plurality of test cases, and selecting a run target test case from among the plurality of test cases, based on test run times taken in previous runs of the plurality of test cases;

generating a dummy module to include simplified code by simplifying code in source code of a second module to be statically linked to a first module called during a previous run of the selected run target test case, so that the simplified code is not related to implementation of the interface indicated in the updated module information;

compiling the first module and the dummy module; and issuing an instruction to run the selected run target test case.

9. An apparatus comprising:

a memory; and a processor coupled to the memory and configured to:

update module information containing pieces of information on interfaces of modules contained in source code of a test run target, in a case where an update of an interface in the source code is detected, refer to test case information containing pieces of information on a plurality of test cases, and select a run target test case from among the plurality of test cases, based on test run times taken in previous runs of the plurality of test cases, generate a dummy module to include simplified code by simplifying code in source code of a second module to be statically linked to a first module called during a previous run of the selected run target test case, so that the simplified code is not related to implementation of the interface indicated in the updated module information, compile the first module and the dummy module, and issue an instruction to run the selected run target test case.

10. The non-transitory, computer-readable recording medium according to claim 1, wherein simplifying code in source code of the second module includes deleting code related to the implementation of the interface and adding code that notifies that a dummy module has been called.

11. The non-transitory, computer-readable recording medium according to claim 1, wherein the compilation time of the dummy module is shorter than a compilation time of the second module.

12. The method according to claim 8, wherein simplifying code in source code of the second module includes deleting code related to the implementation of the interface and adding code that notifies that a dummy module has been called.

13. The method according to claim 8, wherein the compilation time of the dummy module is shorter than a compilation time of the second module.

14. The apparatus according to claim 9, wherein simplifying code in source code of the second module includes deleting code related to the implementation of the interface and adding code that notifies that a dummy module has been called.

15. The apparatus according to claim 9, wherein the compilation time of the dummy module is shorter than a compilation time of the second module.

* * * * *